United States Patent [19]
Smith et al.

[11] Patent Number: 6,068,111
[45] Date of Patent: May 30, 2000

[54] COLLAPSIBLE FEED CONVEYOR SYSTEM

[76] Inventors: Steven L. Smith, 13574 Center St.; Keith A. Schneider, 12467 Jones Rd., both of Eagle, Mich. 48822

[21] Appl. No.: 09/005,543

[22] Filed: Jan. 12, 1998

[51] Int. Cl.$^7$ .................................................. B65G 21/14
[52] U.S. Cl. ........................................ 198/812; 193/35 TE
[58] Field of Search .................................... 198/312, 588, 198/812, 861.1; 193/35 TE

[56] References Cited

U.S. PATENT DOCUMENTS

| | | | |
|---|---|---|---|
| 2,613,788 | 10/1952 | McLaughlin | 193/35 TE |
| 2,721,645 | 10/1955 | Eberle | 198/588 X |
| 3,378,125 | 4/1968 | Fogg | 198/812 X |
| 4,640,404 | 2/1987 | Bigott | 193/35 TE |
| 4,738,345 | 4/1988 | Jenkner | 193/35 C |
| 4,855,174 | 8/1989 | Kawamoto | 428/67 |
| 4,903,824 | 2/1990 | Takahashi | 198/853 |
| 5,205,400 | 4/1993 | Breuss et al. | 198/812 |
| 5,307,917 | 5/1994 | Hall | 198/313 |
| 5,350,048 | 9/1994 | Wylie | 198/35 A |

FOREIGN PATENT DOCUMENTS

| | | | |
|---|---|---|---|
| 1073946 | 7/1959 | Germany | 198/812 |
| 83/01607 | 5/1983 | WIPO | 198/812 |

*Primary Examiner*—James R. Bidwell
*Attorney, Agent, or Firm*—Harness, Dickey & Pierce, P.L.C.

[57] ABSTRACT

A collapsible conveyor system includes a plurality of nestable conveyor components. Each component includes a plurality of wheeled vertical ground supporting members. The conveying portion of each conveyor component includes a pair of spaced apart, longitudinal members or side rails. Positioned vertically between each pair of spaced apart side rails and providing connection therebetween are a plurality of cross-members or roller assemblies. The top side of one rail is slidingly matable with the bottom side of another side rail through a channel-male component arrangement. The rails are composed of a polymerized material. Optionally, one or more elements of the roller assemblies are composed of a polymerized material.

21 Claims, 4 Drawing Sheets

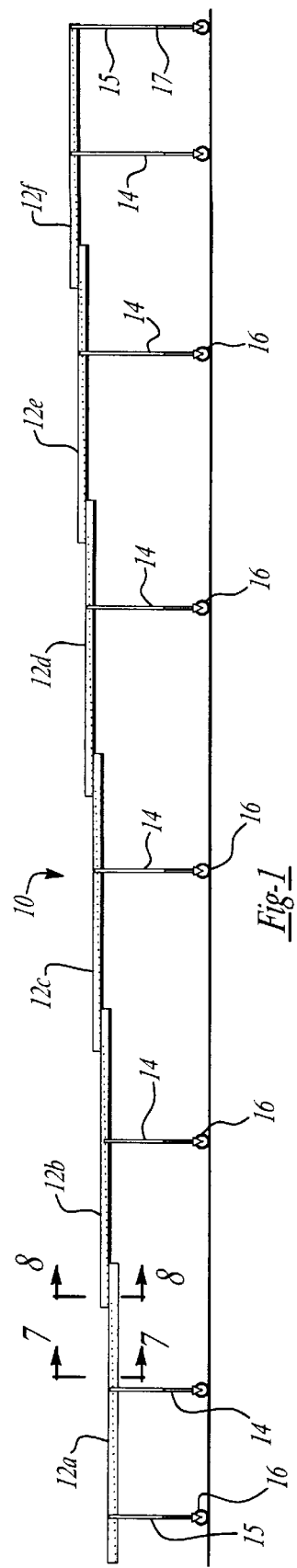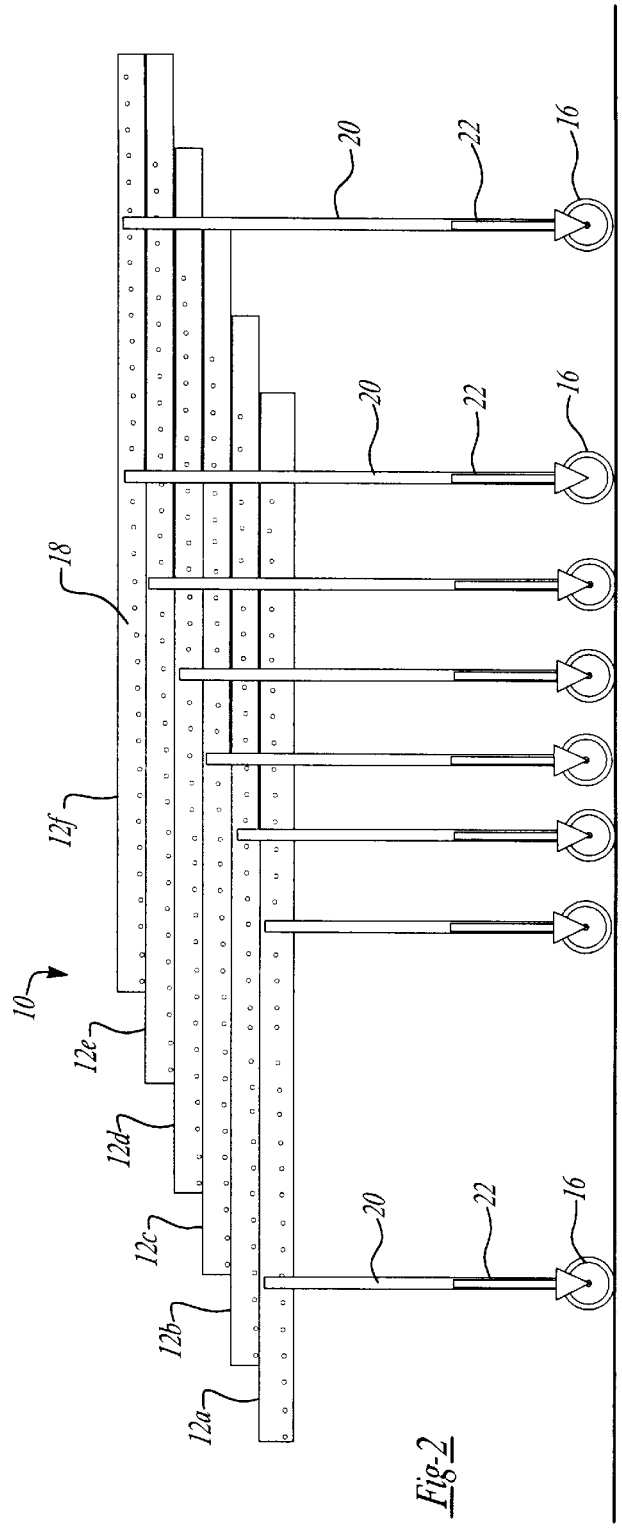

COLLAPSIBLE FEED CONVEYOR SYSTEM

BACKGROUND OF THE INVENTION

1. Technical Field

The present invention relates to collapsible and extendable gravity-type conveyor systems. More particularly, the present invention relates to a gravity-type conveyor system which comprises a series of nestable sections, each of which having polymerized connecting side rails, which may be collapsed or extended with respect to one another.

2. Discussion

Conveyor systems are commonly used for delivering articles from one place to another and commonly over relatively large distances in warehouses, shipping areas, stores and the like. Some conveyor systems are permanent fixtures of such structures and include powered conveyor belts or an array of powered rollers. A variety of such conveyor systems and their components are known. For example, U.S. Pat. No. 5,205,400, issued on Apr. 27, 1993, discloses a belt system for transferring food. The system includes a rack which has a continuous conveyor belt suspended between two spaced apart rollers. The belt may be readily interchanged.

However, it is occasionally desirable to provide a method of conveying articles using a temporary system which may be collapsed for use in different areas. For example, it is frequently the case that goods must be delivered from a delivery vehicle such as a delivery truck to a receiving or unloading dock. In such situations the construction of a permanent conveyor system is undesirable and is frequently impossible. Instead, portable and collapsible conveyor systems are called upon to provide a method of delivering goods. These portable systems are typically not powered and rely on gravity for the movement of goods. To accomplish this task, an array of spaced apart, parallel rollers are provided between two side rails. The rollers are optionally positioned in a gradual incline between the receiving end and the delivery end such that goods deposited at the receiving end are able to travel the length of the conveyor (or of each component of the conveyor) without powered assistance. An example of one such system is disclosed in U.S. Pat. No. 5,350,048, issued on Sep. 27, 1994, which discloses a modular component system for assembly of material flow rails. The system includes a base made of selected ones of a plurality of interchangeable components which may be chosen for a particular application.

Although known systems have provided some solutions to the problems associated with portable conveyor systems, there remain many disadvantages. Of these is the problem of overcomplexity. The most practical portable conveyor system is one able to collapse onto itself by means of a nesting arrangement of each of the components. In this situation, each of the individual components of the system is connected to an adjacent component such that each component may be moved toward or away from the adjacent component without the components becoming disconnected. This arrangement requires an overabundance of individual parts, including, for example, a plurality of roller bearings and races.

An additional problem of known conveyor systems is one of resilience. Known systems are virtually entirely composed of one or more metals, typically aluminum and steel. The long side rails which provide support for the rollers are particularly susceptible to damage, particularly side impacts, which result from improper use or accidental impact. Regardless of the source, the resulting damage typically compromises the effective functioning of the collapsible system. For example, a side impact to an individual component of the known multi-component conveyor system often results in costly damage to the side rails. Once damaged, these components are difficult if not impossible to repair and the collapsing characteristic of the system is severely compromised as a result because both alignment and the slots for the bearings and other sliding mechanisms are altered.

Another problem of known collapsible conveyor systems is that of maintenance. Known systems made of metal require considerable upkeep in the way of lubrication and cleaning. Conveyor systems are exposed to a relatively harsh environment which includes severe dust and other material. Once lubricated to maintain sliding and rolling, this material adheres to the lubricant (typically a grease), resulting in slowed operation and accelerated wear on the moving parts. The only resolution according to known systems is constant cleaning and recleaning of the components which are generally difficult to reach.

Accordingly, an improved collapsible conveyor system remains wanting.

SUMMARY OF THE INVENTION

It is a general object of the present invention to provide a collapsible conveyor system which overcomes the problems inherent in systems of the prior art.

It is a further object of the present invention to provide a collapsible conveyor system which is composed of a minimum number of operating parts.

Still a further object of the present invention is to provide a such a system in which roller bearings, roller bearing surfaces, and similar sliding and rolling elements are eliminated.

A further object of the present invention is to provide such a system in which known side rails are substituted for by a side rail having a single shape which is matable, top-to-bottom, with an adjacent side rail.

Yet an additional object of the present invention is to provide such a system which eliminates the need for lubrication and minimizes maintenance.

An additional object of the present invention is to provide such a system which incorporates side rails composed of a resilient polymerized material.

Yet a further object of the present invention is to provide such a system in which the side rails are readily extruded from the polymerized material.

These and other objects are accomplished by providing a system in which a collapsible conveyor system includes a plurality of nestable conveyor components. Each component includes a plurality of vertical ground supporting members. Preferably a ground supporting wheel is fitted to the bottom-most end of each vertical ground supporting member. It is desirable to have two such supporting members provided at each end of each individual component, with each supporting member of each end pair being provided to the outside of the rail. Each conveyor component is identical to the next with the exception of the height of the vertical ground supporting member. That is, the heights of the vertical ground supporting members of one component are a little greater than the next and so on, thus allowing for nesting of the components with one another.

The conveying portion of each conveyor component includes a pair of spaced apart, longitudinal members or side rails. Positioned vertically between each pair of spaced part side rails and providing connection therebetween are a plurality of cross-members or roller assemblies. The rollers are rotatably mounted on bearing shafts held on a support transversely to the direction of transportation of goods thereover. Each conveyor component has a goods-receiving end and a goods-delivering end. The plurality of rollers are optionally positioned so as to demonstrate a gradual incline from the goods-receiving end toward the goods-delivering end, thereby eliminating the need for powered operation. The rollers may be composed of steel, although other materials such as a plastic could as well be used.

Each of the spaced apart side rails is substantially identical to all of the other side rails. Each side rail includes a top side and a bottom side. The top side of one rail is slidingly matable with the bottom side of another side rail. This connection may incorporate a variety of configurations, but one desirable configuration is to provide a T-shaped member substantially along the entire length of the rail on one side and a similarly shaped channel substantially along the entire length of the rail. The T-shaped member and its mating channel are configured so as to provide a fit sufficiently close so as to restrain wobbling but sufficiently loose so as to allow relatively each movement of one rail with respect to the other. Preferably, although certainly not absolutely, the channel is formed along the top side of the rail and the T-shaped member is formed along the bottom side of the rail.

Lubrication is not entirely eliminated from the conveyor system of the present invention by forming the side rails from a naturally self-lubricating polymerized material such as rubber or a resilient plastic. The preferred limitations of the selection of side rail material are that the material be readily extruded and be resilient so that if struck, for example, along the side no permanent damage results. Other polymerized materials could be substituted therefor. In addition, although not preferred, the side rails could be machined as well as extruded.

These and other characteristics of the present invention overcome the deficiencies of the prior art.

BRIEF DESCRIPTION OF THE DRAWINGS

The present invention will be more fully understood by reference to the following detailed description of the preferred embodiments of the present invention when read in conjunction with the accompanying drawings, in which like reference characters refer to like parts throughout the views, and in which:

FIG. 1 is an elevated side view of the preferred embodiment of the conveyor system of the present invention in its extended position;

FIG. 2 is an elevated side view of the conveyor system of the present invention similar to that of the embodiment of FIG. 1 but illustrating the system in its retracted position;

DETAILED DESCRIPTION OF THE PREFERRED EMBODIMENT

Figure 3:
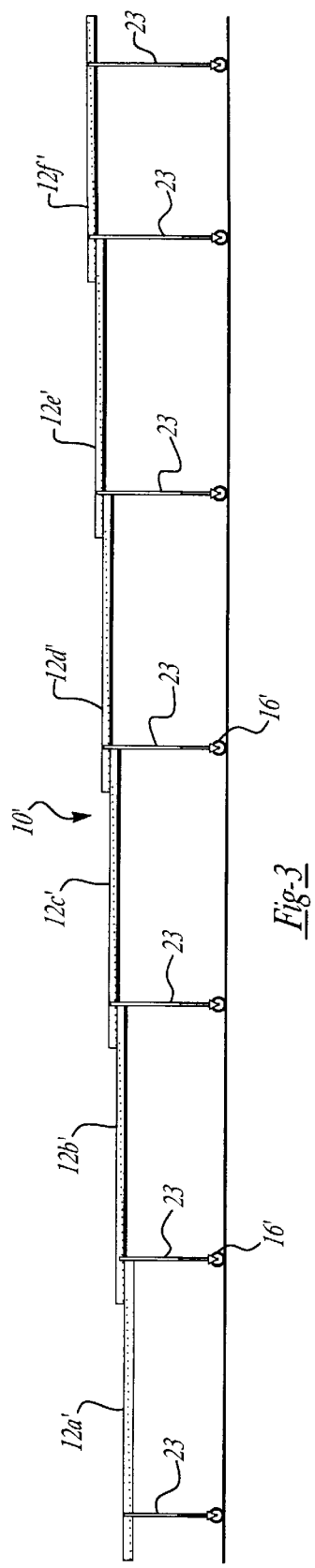
FIG. 3 is an elevated side view of an alternate embodiment of the conveyor system of the present invention in its extended position.

The drawings disclose the preferred embodiment of the present invention. While the configurations according to the illustrated embodiment are preferred, it is envisioned that alternate configurations of the present invention may be adopted without deviating from the invention as portrayed. The preferred embodiment is discussed hereafter.

Referring first to FIG. 1, a side elevational view of a preferred embodiment of the collapsible feed conveyor system of the present invention, generally illustrated as 10, is shown. As illustrated, the conveyor system 10 comprises six individual components 12a, 12b, 12c, 12d, 12e, and 12f. However, it must be understood that this number may be more or less than the six components illustrated. In fact, and although the individual components 12a . . . 12f are designed to work as an assembly, it is possible that a single component, for example, 12a, may be used as a stand alone unit for conveying goods between short distances. In other words, the facility embodied by each individual component 12a . . . 12f for connection with adjacent components does not limit the components to the plural, connected use that is illustrated.

Each of the individual components 12a . . . 12f are substantially alike. The apparent differences in height may be subject to adjustment up or down for each component 12a . . . 12f, as will be set forth below with respect to FIG. 2. Beyond the height differences, the components 12a . . . 12f may be interchanged. Accordingly, and for the sake of simplicity, reference will be made hereafter to an individual component 12a and this description may be taken to apply equally to components 12b . . . 12f.

Still referring to FIG. 1, the individual component 12a includes a plurality vertical ground supporting members 14 and 15. Preferably, there are two supporting members 14 provided per each middle component 12b, 12c, 12d, and 12e while each of the end components 12a and 12f includes one pair each of the additional outside supporting members 15. Each ground supporting member 14 and 15 preferably includes at its lowermost end a roller or a wheel 16. The wheels 16 are provided to allow the operator to set up the conveyor system 10. This setting up consists of expanding the array of individual components 12a . . . 12f to the desired length. Each of the wheels 16, when present, is preferably of the lockable type, so as to minimize the risk that the component will travel undesirably after set up and during operation.

The component 12a further includes a pair of spaced apart, longitudinal members or side rails 18. As illustrated, the ground supporting members 14 and 15 are fitted to the outside of the rails 18. The side rails 18 include top and bottom formations which enable connection with the side rails of conveyor adjacent components as will be explained below with respect to FIGS. 7 and 8.

FIG. 2 illustrates the collapsible conveyor feed system 10 of the present invention in its substantially collapsed position. Noteworthy is the ability of the individual components 12a . . . 12f to nest so as to minimize the amount of overall space consumed by the system 10. Nesting is permitted due to the differences in height between the ground supporting members 14 and 15. The different heights of the members 14 and 15 may be fixed or may be selectably adjustable based on the desires of the operator. According to the latter embodiment, the individual members 14 and 15 each comprise a pair of adjustably connected members 20 and 22. The member 20 may be threadably mated to the member 22 so as to allow for adjustment in length as might be desired. While threaded attachment is a desired form of mating member 20 to member 22, other forms may be adopted such as an adjustable locking collar on member 22 (not shown) to engage a smooth portion of member 20.

FIG. 3 is a side elevational view of an alternate embodiment of the collapsible feed conveyor system of the present invention, generally illustrated as 10'. Like its counterpart of FIG. 1, the conveyor system 10' comprises six individual components 12a', 12b', 12c', 12d', 12e', and 12f', a quantity which may be more or less than the six components illustrated.

Each of the components 12a' . . . 12f' includes a plurality of vertical ground supporting members 23. According to the illustrated embodiment, there are four supporting members provided per component with two at each end. Each ground supporting member 23 preferably includes at its lowermost end a roller or a wheel 16'.

Figure 4:
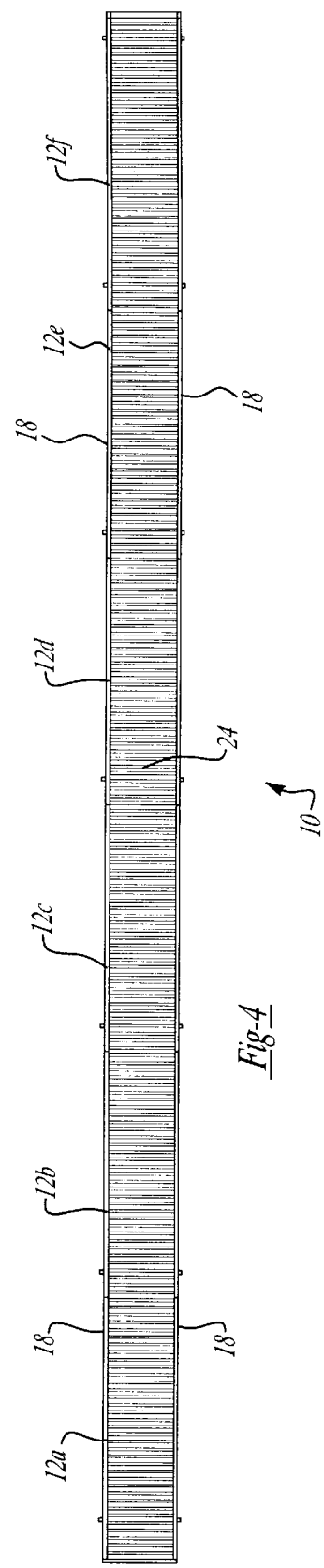
FIG. 4 is a top plan view of the conveyor system of the present invention in its extended position.

FIG. 4 is a top plan view of the collapsible conveyor system 10 according to the present invention. This view illustrates the overall goods-carrying arrangement of the system 10 as defined by each of the individual components 12a . . . 12f. A plurality of roller assemblies 24 are fitted between the pair of spaced apart side rails 18.

Figure 5:
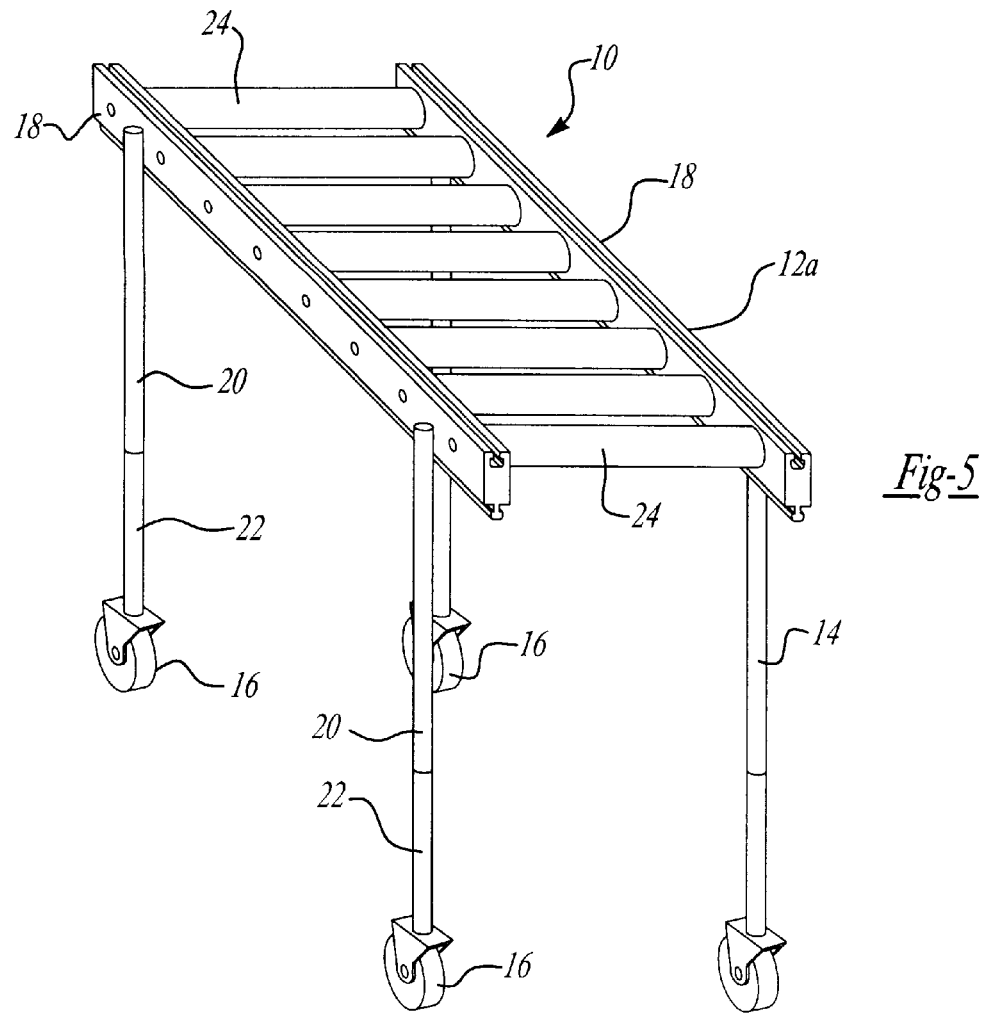
FIG. 5 is a perspective view of a single conveyor system component according to the present invention.

FIG. 5 illustrates a perspective view of a single component 12a of the conveyor system 10. As noted above, the single component 12a may be any one of the components 12a through 12f. As illustrated best in FIG. 2, the roller assemblies 24 may be positioned between the rails 18 in a gradually inclined configuration such that goods introduced at one end of each system component (appearing in the far right of, for example, component 12f of FIG. 2) will advance toward the other end of the system component having the lowest-positioned roller assembly 24 (appearing in the tar left of, again by way of example, component 12f of FIG. 2) being driven by gravity. According to this arrangement of the rollers, a package delivered at the far right side of the system 10 as illustrated in FIG. 1 will work its way down to the far left side, component-by-component. However, the inclined arrangement is not exclusive, and the rollers may be substantially parallel with the bottom edge of the rails 18. In addition, a greater or lesser number of roller assemblies 24 may he used in the system 10 depending on the situation.

Referring back to FIG. 5, the roller assemblies 24 connect each of the rails 18 to provide cross-member support. Additional cross-member support may be added as required for the particular service such as underslung bars or rods provided below or between selected ones of the roller assemblies 24.

Figure 6:
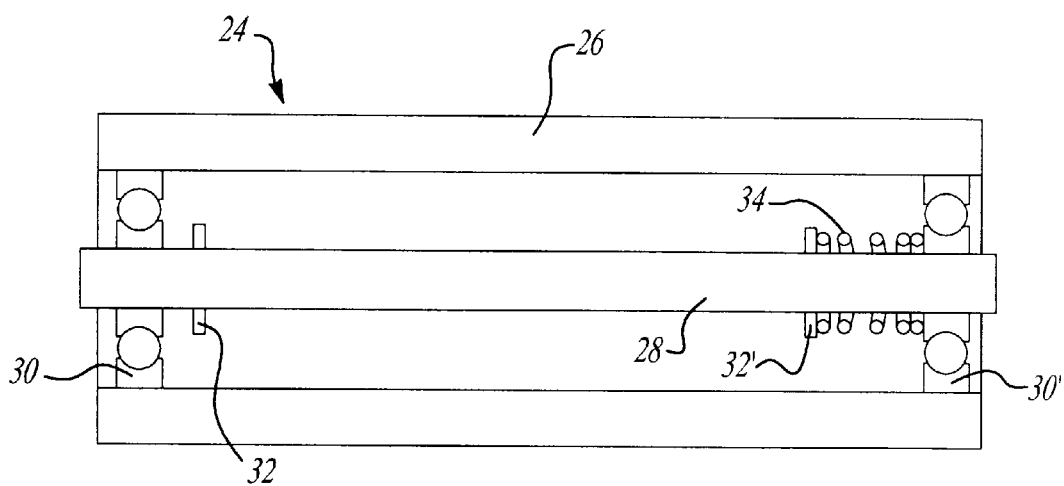
FIG. 6 is a sectional view of one roller assembly.

A single roller assembly 24 is illustrated in cross section in FIG. 6. The roller assembly 24 includes a roller 26 and a roller shaft 28. At one end of the roller 26 is provided a bearing assembly 30 and at the other is provided a bearing assembly 30'. The illustrated bearing assemblies 30, 30' are of the ball bearing type, and include inner and outer bearing races as well as the ball bearings themselves. However, it is to be understood that other configurations of bearings may be used such as roller or sleeve bearings.

An array of dimples or a pin 32 is provided at one end of the shaft 28 to retain the bearing assembly 30 in position. Similarly, an array of dimples or a pin 32' is provided at the other end of the shaft 28 to retain the bearing assembly 30' in position. A spring 34 is provided on the shaft 28 to allow the shaft 28 to be moved in a direction to allow the roller assembly 24 to be placed between the opposed rails 18.

Known roller assemblies are substantially composed of steel and include a steel roller and a steel shaft. (Other metals, such as aluminum have been used as well.) However, metals have proven unwieldy because of sheer weight. As a preferable alternative, the bearing assemblies 24 of the present invention may be composed substantially of plastic materials such that the roller 26 is composed of a plastic (such as a polyvinyl chloride [PVC] pipe) and the shaft 28 may be composed of polypropylene, polyethylene, or various ultrahigh molecular weight plastics. If appropriately constructed and proportioned, considerable reduction in weight may be achieved with only marginal (if any) loss in integrity through the use of one or more plastic components in the construction of the roller assembly 24. The inside diameter of the roller 26 is proportioned (via machining, molding, or extrusion) so as to accommodate the bearings 30, 30' and the shaft 28.

Figure 7:
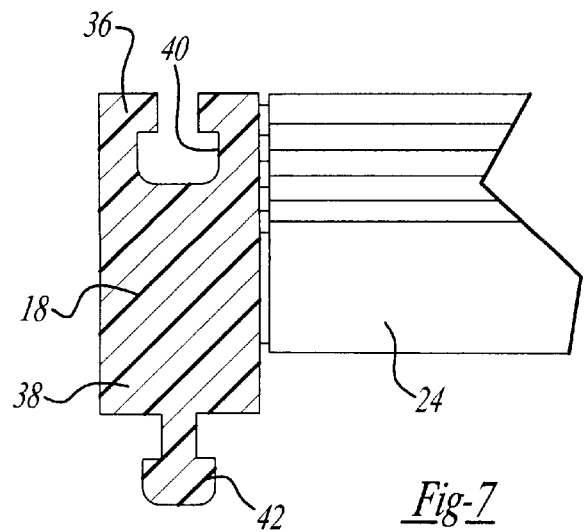
FIG. 7 is a sectional view of a side rail and a related roller as taken along line 7—7 of FIG. 1.

An important feature of the present invention is its simplicity over known conveyor systems. This simplicity is accomplished in large part by the configuration and material selection of the rails 18. Referring to FIG. 7, a sectional view of one of the rails 18 of the system 10 taken along lines 7—7 of FIG. 1 is illustrated. The rail 18 is shown in relation to a series of the roller assemblies 24. The rail 18 includes a top side 36 and a bottom side 38. A channel 40 is formed longitudinally preferably along the full length of the top side 36 of the rail 18. Similarly, a male component 42 is formed longitudinally preferably along the full length of the bottom side 38 of the rail 18. As illustrated, and with respect to FIG. 8 in which the rail 18 is shown in position over a rail 18', the channel 40 and the male component 42 are defined by shapes which are substantially mirror images of each other such that one rail 18 will be connectable to another rail 18'.

Figure 8:
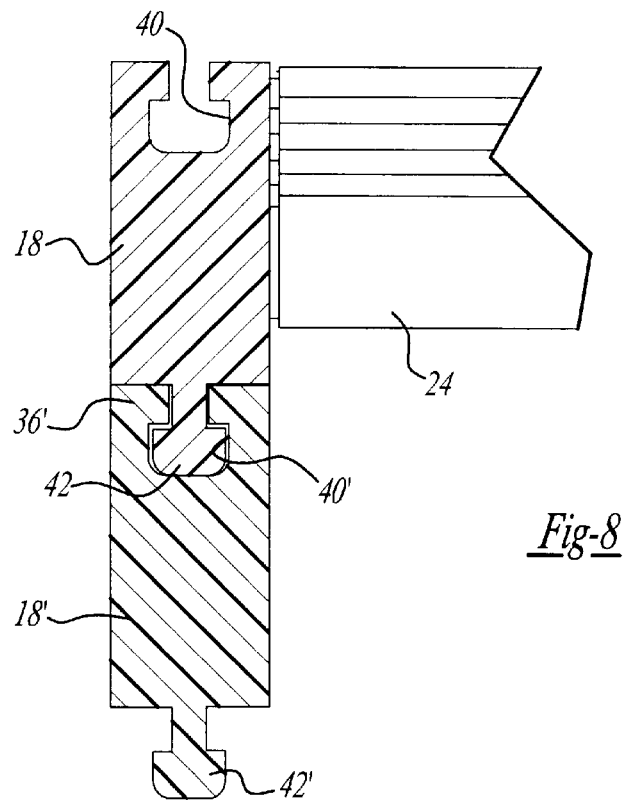
FIG. 8 is a sectional view of a pair of connected side rails and a related roller taken along line 8—8 of FIG. 1.

More particularly, the lower rail 18' includes a top side 36' and a bottom side 38', A channel 40' is formed longitudinally preferably along the full length of the top side 36' while a male component 42' is formed longitudinally preferably along the full length of the bottom side 38' of the rail 18'. (Of course, the arrangement could be reversed such that the male component is formed along the top side of the rail and the channel is formed along the bottom side of the rail. In addition, the rails for the end components may have only a channel formed therein or only a male component formed thereon.) The channels 40, 40' have a "T" configuration, as do the male components 42, 42'. FIG. 8 illustrates how the fit between the channels 40, 40' and the male components 42, 42' are defined such that clearance between the two is limiting but not necessarily restrictive. This construction allows one rail to be slidingly moved with respect to another rail without binding but with some resistance.

While the "T" shapes depicted in FIGS. 7 and 8 are suggested and perhaps preferred, they are in no way to be considered as limiting. For example, it is possible to use an "L" shape or some other shape having a slot or a vertical element (representing a female or a male component, respectively) connected to the rail and a horizontal channel or element (again representing a female or a male component, respectively) connected to the slot or vertical element. The important feature of the relationship of channel and member between the rails is that sliding movement be allowed without side-from-side separation.

It is also a preferred feature of the present invention to provide the rails 18 to be formed from a polymerized material of some type such as a plastic or a hard rubber. If a plastic, polypropylene or polyethylene may be used as well as other forms. The rails may be molded, extruded or machined from the base plastic or rubber. This composition allows for permanent lubrication which may obviate the necessity of external lubricants.

Those skilled in the art can now appreciate from the foregoing description that the broad teachings of the present invention can be implemented in a variety of forms.

Therefore, while this invention has been described in connection with particular examples thereof, the true scope of the invention should not be so limited since other modifications will become apparent to the skilled practitioner upon a study of the drawings, specification and following claims.

What is claimed is:

1. A collapsible conveyor system comprising:
at least two conveyor components, each of said at least two conveyor components including a pair of spaced apart elongated side rails and a plurality of rollers positioned between said side rails, each of said rails having a length, each said side rails including a first side and a second side, said first side having provided thereon a male member substantially continuous with said length, said second side having formed thereon a channel substantially continuous with said length, said male member having a shape and said female channel having a shape, said male member shape and said female member shape being substantially identical whereby at least a portion of said male member of a first rail is slidably engageable with said female channel of a second rail.

2. The collapsible conveyor system of claim 1, wherein said male member includes an upright portion and a top portion formed substantially perpendicularly with respect to said upright portion.

3. The collapsible conveyor system of claim 1, wherein said male member substantially defines a T shape.

4. The collapsible conveyor system of claim 1, wherein each of said side rails is composed of a polymerized material.

5. The collapsible conveyor system of claim 4, wherein said polymerized material is a plastic.

6. The collapsible conveyor system of claim 4, wherein each of said rails is extruded.

7. The collapsible conveyor system of claim 1, wherein each of said conveyor components further includes a plurality of upright supporting members.

8. The collapsible conveyor system of claim 7, wherein each of said upright supporting members includes an end and a wheel fitted to said end.

9. A collapsible conveyor system comprising:
a first conveyor system component having a pair of spaced apart side rails and a plurality of rollers fitted therebetween, each of said pair of rails having a side, said side having formed thereon a male member defined by an upright portion and a top portion formed substantially perpendicularly with respect to said upright member;
a second conveyor system component having a pair of spaced apart side rails and a plurality of rollers fitted between said pair of spaced apart side rails, each of said pair of rails having a side, said side having formed therein an elongated channel, said male member of said rail of said first conveyor system being slidably engageable with said elongated channel.

10. The collapsible conveyor system of claim 9, wherein each of said rails of said first component further includes a male member-receiving channel formed therein.

11. The collapsible conveyor system of claim 10, wherein each of said rails of said second component further includes a channel-cooperative male component formed thereon.

12. The collapsible conveyor system of claim 11, wherein said rails of said first component and said rails of said second component are formed from an extruded polymerized material, said male members being integral therewith.

13. A roller assembly for a conveyor system, the roller assembly comprising:
a pair of spaced apart elongated rails; and
a plurality of rollers rotatably mounted between said pair of spaced apart rails,
each of said rails having a body, said body having a length, at least one of said rails including a female channel formed therein and a male interlocking component formed integrally with said body, said male interlocking component extending substantially along said length of said body of at least one of said rails, each of said pair of rails including a first side and a second side, said male interlocking component being formed on said first side and said female channel being defined on said second side.

14. The roller assembly of claim 13, wherein each rail of said pair of spaced apart rails is composed of an extruded polymerized material.

15. The roller assembly of claim 13, wherein at least one of said plurality of rollers includes a roller tube composed of a polymerized material.

16. The roller assembly of claim 13, wherein said male interlocking component defines a cross-sectional shape, said shape including an upright position.

17. The roller assembly of claim 13, wherein said female channel has a cross-sectional shape, said shape being defined by a first slot.

18. The roller assembly of claim 17, wherein said shape of said female channel is further defined by a second slot, said second slot being substantially perpendicular to said first slot so as to define a T-shaped channel.

19. The roller assembly of claim 16, wherein said shape further includes a cross member, said upright portion and said cross member defining a T-shape.

20. A roller assembly for a conveyor system, the roller assembly comprising:
a pair of spaced apart elongated rails, at least one rail of said pair of rails including a female channel formed therein, said female channel having a cross-sectional shape, said shape being defined by a first slot, said shape of said female channel being further defined by a second slot, said second slot being substantially perpendicular to said first slot so as to define a T-shaped channel; and
a plurality of rollers rotatably mounted between said pair of spaced apart rails, each of said rails having a body, said body having a length, at least one of said rails including a male interlocking component formed integrally with said body, said male interlocking component extending substantially along said length of said body of at least one of said rails.

21. A roller assembly for a conveyor system, the roller assembly comprising:
a pair of spaced apart elongated rails; and
a plurality of rollers rotatably mounted between said pair of spaced apart rails,
each of said rails having a body, said body having a length, at least one of said rails including a male interlocking component formed integrally with said body, said male interlocking component extending substantially along said length of said body of at least one of said rails, said male interlocking component defining a cross-sectional shape, said shape including an upright position, said shape further including a cross member, said upright portion and said cross member defining a T-shape.

* * * * *